UNITED STATES PATENT OFFICE.

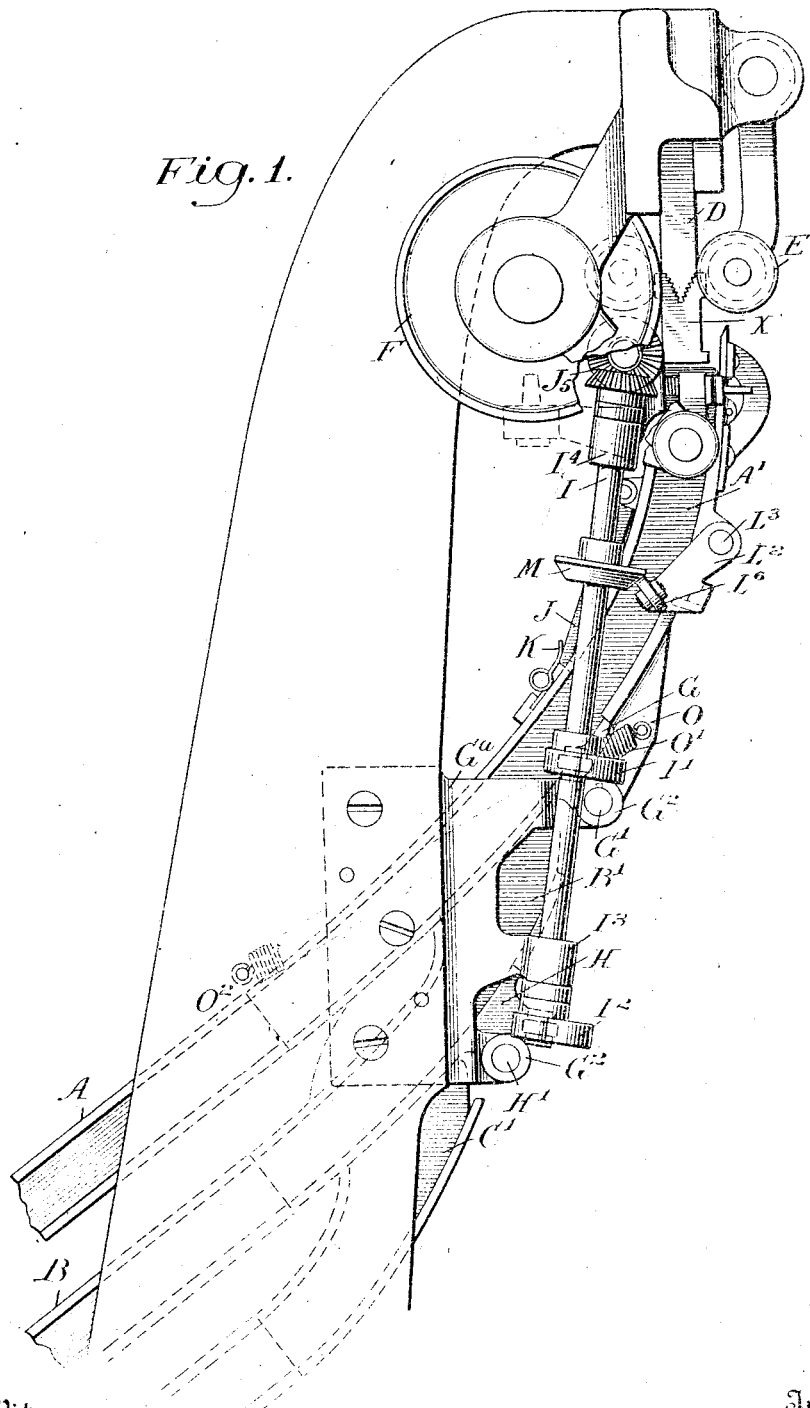

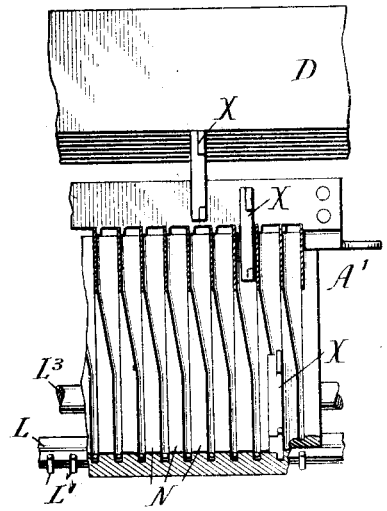
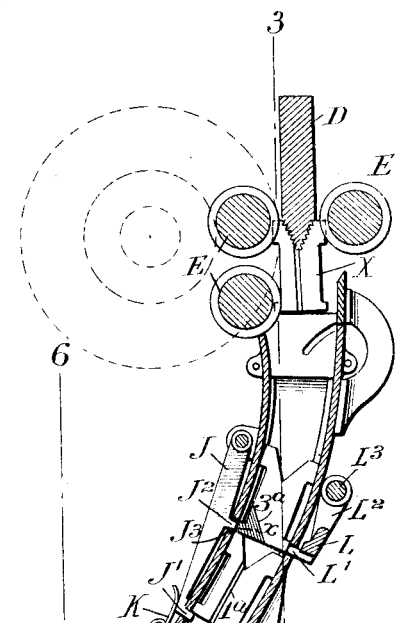
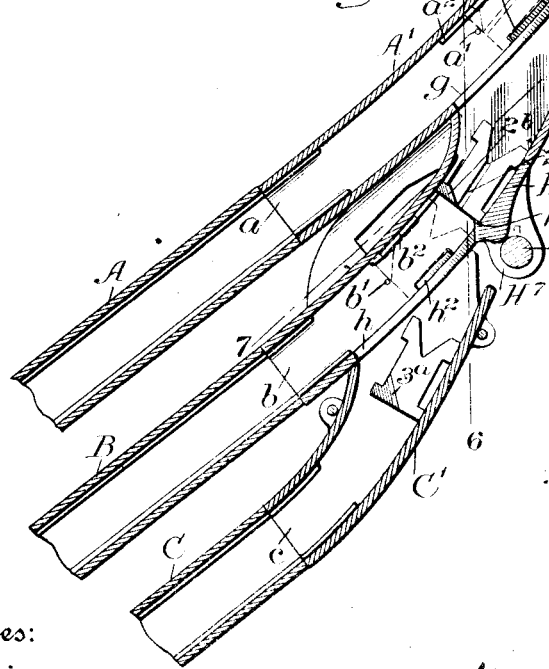
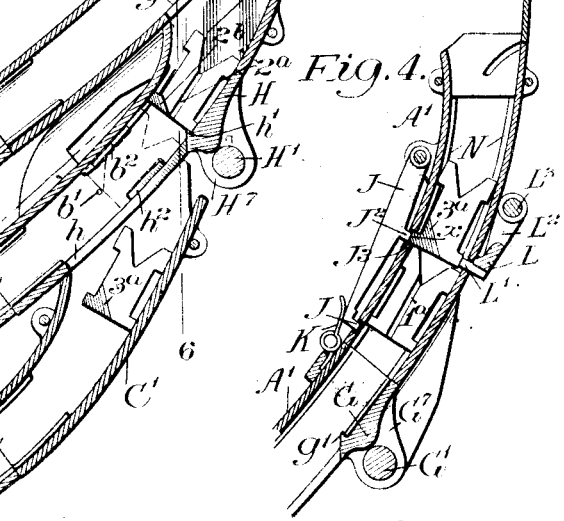

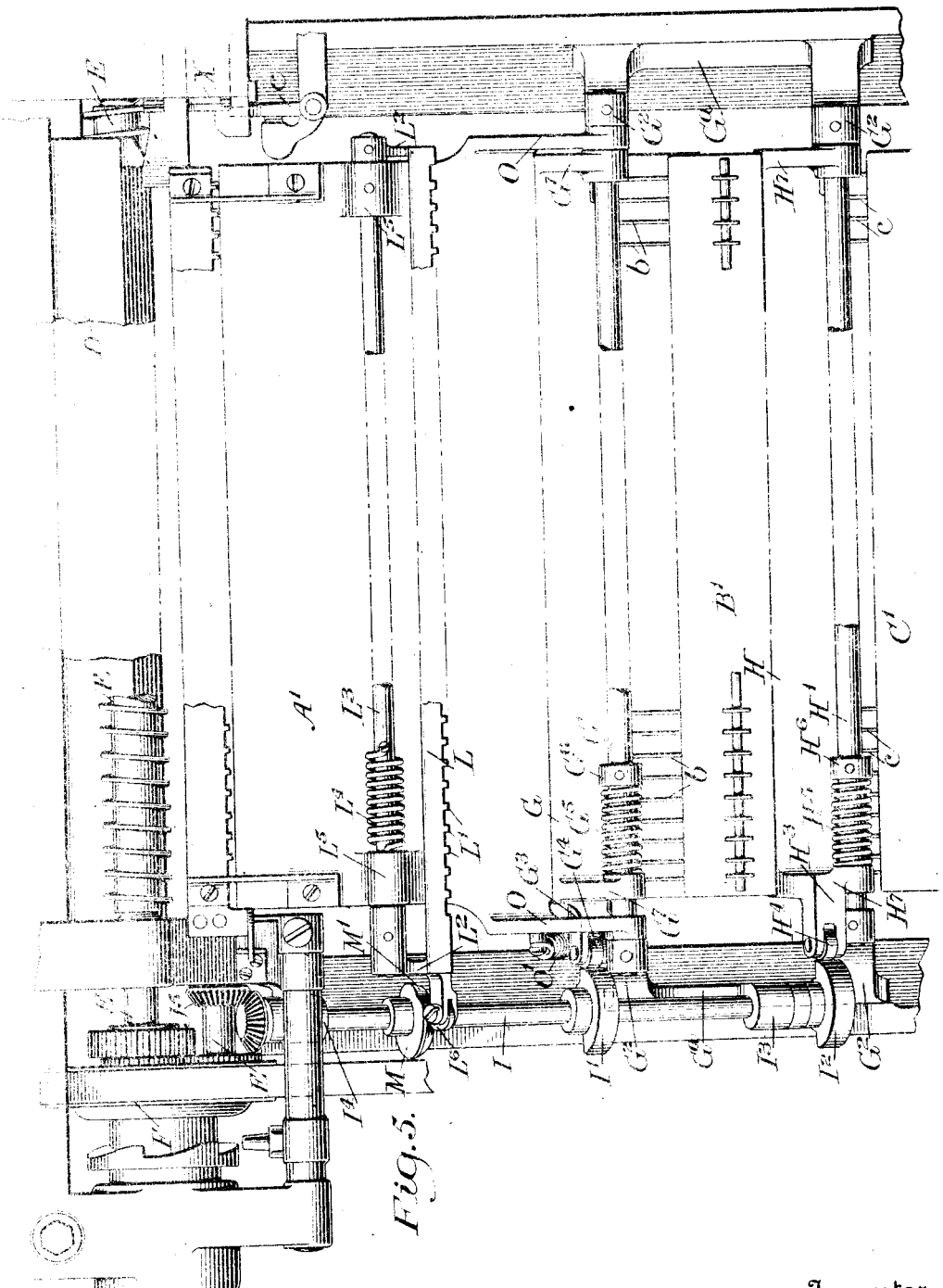

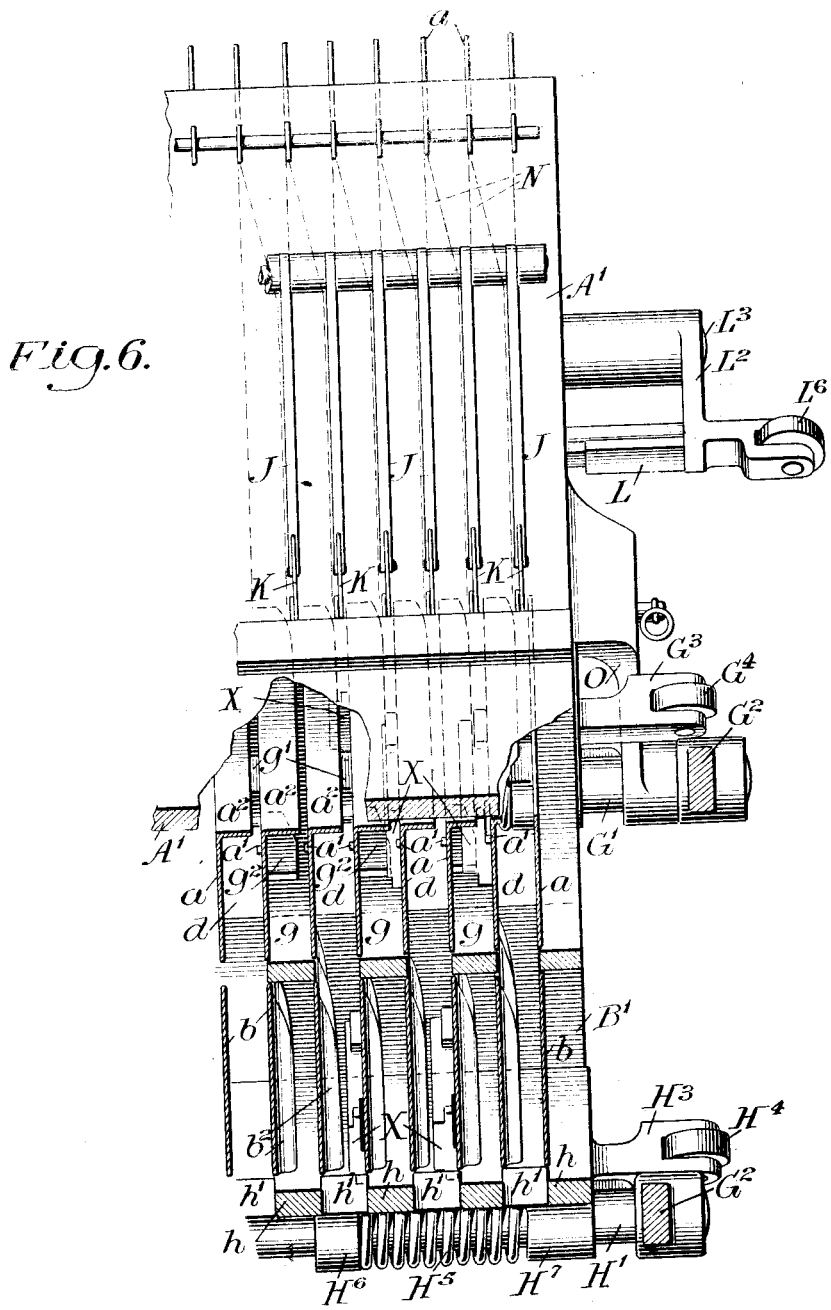

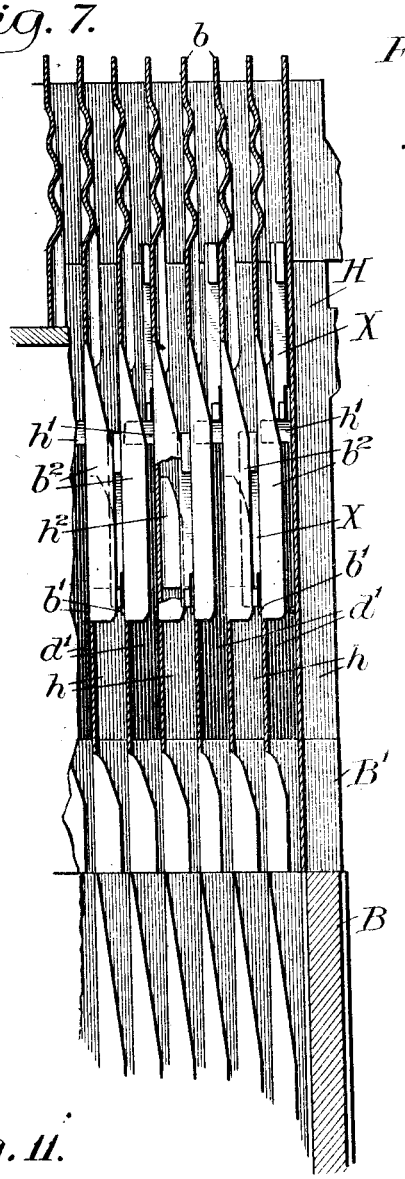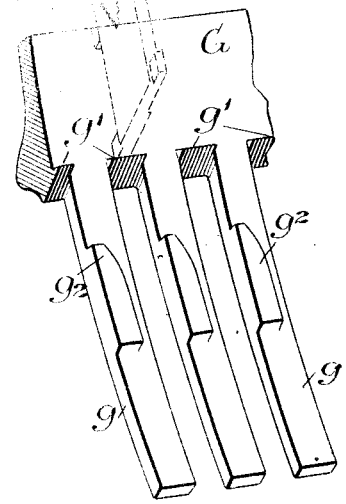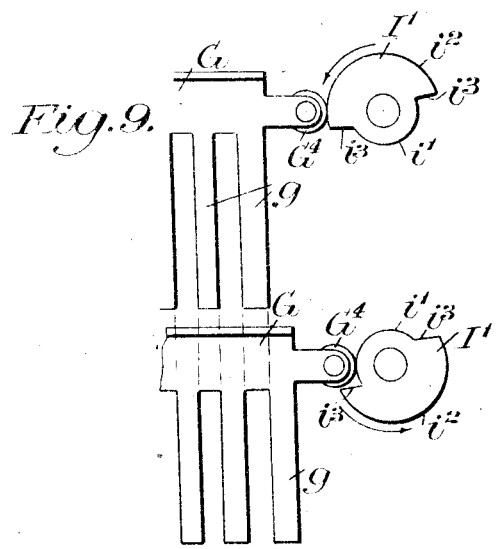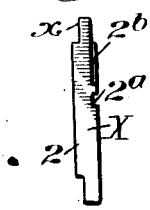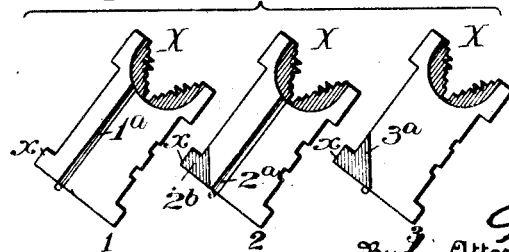

GEORGE P. KINGSBURY, OF BROOKLYN, NEW YORK, ASSIGNOR TO MERGENTHALER LINOTYPE COMPANY, A CORPORATION OF NEW YORK.

TYPOGRAPHICAL MACHINE.

1,182,385.  Specification of Letters Patent.  Patented May 9, 1916.

Application filed January 9, 1915. Serial No. 1,288.

*To all whom it may concern:*

Be it known that I, GEORGE P. KINGSBURY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436532, to O. Mergenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through distributing mechanism to the magazine from which they started.

More particularly, it relates to distributing mechanism for such machines when equipped with a plurality of fonts, the general principle involved being the preliminary separation of the matrices according to letter and their subsequent delivery according to font.

In the accompanying drawings, I have shown my invention in preferred form and by way of example, and as applied to a linotype machine, but obviously many changes and variations may be made therein, and in its mode of application, which will still be comprised within its spirit. Thus, it may be similarly applied to other forms of typographical machines, such as typesetters and the like, which handle type or dies instead of matrices.

Generally speaking, I desire it to be understood that I do not limit myself to any specific form or embodiment, except in so far as such limitations are specified in the claims.

Referring to the drawings: Figure 1 is a side elevation of a portion of a linotype machine, having my invention applied thereto; Fig. 2 is a vertical section thereof; Fig. 3 is a section on the line 3—3 of Fig. 2; Fig. 4 is a detached detail view similar to Fig. 2; Fig. 5 is a rear view; Fig. 6 is a section on the line 6—6 of Fig. 2; Fig. 7 is a section on the line 7—7 of Fig. 2; Fig. 8 is a detached detail perspective; Fig. 9 is a diagrammatic detail; Fig. 10 illustrates the special form of matrices employed; and Fig. 11 is an end view of one of the matrices.

The matrices X are stored according to font in the channeled magazines A, B, C, from which they are released in the required order and assembled in line in the customary way. After the slug has been cast, the line is carried upward and transferred endwise toward a lifting finger $e$ (see Fig. 5), by which the matrices are detached from the line, one at a time, and delivered between the threads of conveying screws E, rotated in the usual way from the driving pulley F. The screws E carry the matrices along a longitudinally grooved distributer bar D, which releases them at different points in its length according to character and irrespective of font.

As the matrices are released from the bar D, they drop into a channel-entrance $A^1$ leading to the magazine A and divided by partitions $a$ into a series of channels, one for each channel in the magazine. Branching off from and beneath the entrance $A^1$ is a second entrance $B^1$ for the magazine B, the latter entrance being divided by partitions $b$ into channels which communicate with the former channels by means of openings or passages $d$ formed in the under side thereof (see particularly Fig. 6). Similarly, the magazine C has an entrance $C^1$ divided by partitions $c$ into channels which communicate with those of the entrance $B^1$ through openings $d^1$ formed in the under side of the latter, (see particularly Fig. 7). This arrangement constitutes in effect a plurality of series of communicating tubes or conductors leading from the distributer to the respective magazines. While I have shown but three magazines in the drawings, it will be obvious that the arrangement is equally applicable to a greater number.

The partitions $a$ of the entrance $A^1$ are formed with laterally projecting pins $a^1$ located opposite the openings $d$ in position to engage the descending matrices belonging to the two lower magazines B and C, and deflect them edgewise therethrough into the entrance $B^1$. The partitions $b$ of the entrance $B^1$ are similarly formed with projecting pins $b^1$, which serve to deflect matrices belonging to the lower magazine C into the entrance $C^1$.

Inasmuch as the matrices belonging to the magazines A and B have to pass the openings $d$ and $d^1$ in their respective entrances, means are provided for closing such openings periodically. In the present instance, I employ for this purpose two laterally reciprocating plates G and H, carried at their opposite ends by supporting arms $G^7$ and $H^7$, respectively, which arms are splined to transverse rods $G^1$ and $H^1$ mounted in rearwardly projecting arms $G^2$ of a pair of brackets $G^a$ fixed to the framework of the machine at opposite sides (see particularly Fig. 5). The plate G is formed with a series of projecting flaps $g$ suitably spaced apart in such manner as to close the openings in alternate channels of the entrance $A^1$; and the plate H is likewise formed with a series of projecting flaps $h$ spaced apart in similar manner so as to close the openings in the corresponding alternate channels of the entrance $B^1$. It follows from this construction that as the plates are laterally reciprocated back and forth upon their supporting rods, the projecting flaps will, in one position of the plate, close the openings in alternate channels (which may be regarded as one group), and in the other position of the plate, they will close the openings in the intermediate channels (which may be regarded as a second group). It also follows from the construction that when the openings in one group of channels are closed, the openings in the other group will be open. It is also necessary to arrest the matrices in the group of channels whose openings are, for the time being, open, as otherwise, they would be immediately deflected therethrough into the underlying channel entrance irrespective of font. The plates G and H are therefore formed with upstanding lips or shoulders $g^1$ and $h^1$ respectively, located between their projecting flaps and in such position as to arrest the descending matrices above the openings in alternate channels. In this way, when the openings in one group of channels are closed, the shoulders will arrest the matrices above the openings in the other group. In other words, when the matrices in each group are arrested, its openings will be exposed, and when the matrices are subsequently released, its openings will be covered, these actions taking place alternately between the two groups as the plate moves back and forth.

The means for effecting the reciprocations of the plates G and H will now be described, reference being had particularly to Figs. 1 and 5. A spring $G^5$ is interposed between a fixed collar $G^6$ on the rod $G^1$ and one of the arms $G^7$ of the plate G, and tends normally to shift the latter to the right. Similarly, a spring $H^5$ is interposed between a collar $H^6$ on the rod $H^1$ and an arm $H^7$ of the plate H, and tends normally to move the latter toward the right. The plates G and H are provided at their ends with projecting arms $G^3$ and $H^3$, respectively, carrying rollers $G^4$ and $H^4$, which track upon rotary cam members $I^1$ and $I^2$ fast on an upright shaft I, journaled in bearings $I^3$ and $I^4$ in the framework, and receiving motion through gearing $J^5$ from one of the distributer screws E. According to this construction, the plates G and H are moved in one direction by the members $I^1$ and $I^2$ and in the opposite direction by their springs $G^5$ and $H^5$.

The members $I^1$ and $I^2$ are arranged so as to allow a slight dwell of the plates in both of their reversed positions, and as they are identical in form but one will be described. Referring to Fig. 9, it will be seen that the member $I^1$ comprises two concentric portions $i^1$ and $i^2$ of different radius, the outer peripheries of these portions being connected by straight surfaces $i^3$. In the upper part of the figure, the plate G is shown in its position to the left with its roller $G^4$ tracking upon the concentric portion $i^2$ having the greater radius. As the member $I^1$ continues its rotation in the direction indicated, the plate will be maintained in this position until one of the straight surfaces $i^3$ is brought opposite the roller, when the spring $G^5$ will move the plate to the right and bring the roller $G^4$ into engagement with the concentric portion $i^1$ having the smaller radius. The plate will now be allowed to remain in this latter position until the opposite inclined surface $i^3$ engages the roller and shifts the plate back to its original position, when the roller $G^4$ will again travel upon the portion $i^2$ having the greater radius. The matrices will thus be given ample time when released to pass across or through the openings into their proper magazines.

The matrices employed are illustrated in Fig. 10, there being three fonts in all, one for each of the magazines, and numbered 1, 2 and 3. The matrices of font 1 are formed in their side faces with longitudinal grooves $1^a$ extending throughout their body portions and located in position to register with the pins $a^1$ of the entrance $A^1$ so as to allow the matrices to pass thereby into the magazine A. The matrices of font 2 are formed in their side faces with inclined cuts or notches $2^b$ adapted to engage the pins $a^1$ and be deflected thereby through the openings $d$ into the entrance $B^1$. These matrices are further formed in their side faces with grooves $2^a$ extending longitudinally throughout their body portions and located in position to register with the pins $b^1$ of the entrance $B^1$ so as to permit them to pass thereby into the magazine B. The matrices of font 3 are formed with inclined cuts or notches $3^a$ of greater depth than the notches $2^b$ in the matrices of font 2, so as to be engaged both by the pins $a^1$ and the pins $b^1$ and thus be deflected successively through the openings $d$ and $d'$ into the entrance $C^1$, whence they may pass directly into the magazine C. The depth of the notches is indicated in Fig. 11, which is an end view of one of the matrices of font 2.

The general operation of the parts so far described is as follows: The matrices are distributed first according to character irrespective of font, and pass downwardly through the channels in the entrance $A^1$. Assuming the plate G to be in either of its two positions, the leading matrices in one group of channels are arrested by the shoulders $g^1$, (as shown by full lines in Fig. 2), the openings of these channels being uncovered. The leading matrices in the other group of channels are allowed to pass to a further point, where they rest upon and are supported by the flaps $g$ which close the openings in those channels, (see the dotted line showing in Fig. 2 and the full line showing in Fig. 6). If any or all of the leading matrices of this latter group belong to the magazine A, their notches $1^a$ will register with the pins $a^1$ and they will thus be allowed to pass directly into the magazine. Otherwise, the pins $a^1$ engage in the notches $2^b$ or $3^a$ of the matrices according to font, and arrest them temporarily until the plate G is moved to its other position, when they no longer receive support from the flaps $g$ and are then deflected by the pins $a^1$ through the openings $d$ into the entrance $B^1$. This movement of the plate also withdraws the shoulders $g^1$ from the first group of channels and allows them to advance, the flaps $g$ now covering the openings in that group. To recapitulate, if the leading matrices belong to magazine A, the grooves in their side faces will register with the pins $a^1$ and allow them to pass directly thereinto, whereas, if they belong to either of the two lower magazines, they will be arrested momentarily by the pins $a^1$ and subsequently allowed to drop or be deflected thereby through the openings $d$ when the plate G is moved to its opposite position.

A similar action takes place in the entrance $B^1$. For instance, the matrices in one group of channels are arrested by the shoulders $h^1$, while those in the other group pass beyond and are supported by the flaps $h$ which cover the openings therein, (see particularly Fig. 7). If the leading matrices of this latter group are destined for the magazine B, their grooves $2^a$ will register with the pins $b^1$ and they are thus allowed to pass directly thereinto. If, however, the leading matrices are destined for the magazine C, the pins $b^1$ will arrest them opposite the opening $d'$ and then deflect them therethrough when the flaps are subsequently withdrawn by the movement of the plate H. Of course, the movement of the plate simultaneously withdraws the shoulders $h^1$ from the first group of channels and allows the matrices, which had previously been arrested thereby, to pass downwardly and be supported by the flaps $h$ which now cover the openings in the channels. The matrices which are deflected through the openings $d'$ pass through the entrance $C^1$ directly into the magazine C.

To insure the engagement of the notches or grooves in the matrices with the pins $a^1$ of the entrance $A^1$, I provide the partitions $a$ at their upper edges with flanges $a^2$ (Figs. 2 and 6) projecting partly across the channels so as to engage and guide the matrices by the projecting ears on one of their edges, and also the cover flaps $g$ of the reciprocating plate G with similar flanges $g^2$ (Fig. 8) to engage the ears on the opposite edge of the matrices. In this way, as the matrices pass along the channels they are held with their side faces flat up against the side faces of the partitions $a$, thus insuring the engagement of the pins in the notches irrespective of the thickness of the body portions of the matrices. The partitions $b$ of the entrance $B^1$, and the cover flaps $h$ of the reciprocating plate H are similarly formed (Fig. 7) with projecting flanges $b^2$ and $h^2$ respectively, which coöperate with the matrices in the manner just described.

In order that the matrices may be presented uniformly and in proper time to the action of the reciprocating plate G, I preferably provide a series of escapement pawls J (see Figs. 1, 2, 4 and 6) pivoted at their upper ends to the upper side of the entrance $A^1$, and formed at their lower ends with lips $J^1$ projecting into the entrance channels in position to arrest the descending matrices above the plate G. The pawls are normally held in their arresting position by spring fingers K arranged in engagement with their lower ends. In order to effect the releasing action of the pawls, I provide each with a lug $J^2$ located normally in an opening $J^3$, formed in the entrance, and in such position that the lower ear $x$ on the upper edge of a following matrix will stand opposite the lug when it falls upon a preceding matrix, which is arrested by the lip $J^1$. By shifting the second matrix edgewise, its ear $x$ will enter the opening $J^3$ and push the lug $J^2$ before it, thereby raising the lower end of the pawl and withdrawing the lip $J^1$ from the channel, (see Fig. 1). The lowermost matrix now slides forward until it is arrested either by a shoulder $g^1$ on the plate G or a pin $a^1$ on the partition $a$, the spring K thereafter returning the pawl J to its original position and projecting the lip $J^1$ again into the channel. This return movement of the pawl also causes its lug $J^2$ to disengage the ear $x$ of the second matrix from the opening J³ when the matrix will slide forward and be arrested by the lip J¹. The actuation of the escapement pawls J is effected in synchronism with the movement of the plate G, so that when a matrix is released by one or another of the pawls, the plate will be in proper position to receive it.

The edgewise shifting of the matrices before alluded to is secured by a rocker plate L (Figs. 1, 2, 3, 4, 5 and 6) having a series of teeth L¹ projecting into the magazine channel to engage the lower ears of the matrices. The plate L is carried by a pair of arms L² located at its opposite ends and fast to a rock shaft L³ mounted to turn in bearings L⁵ on the under side of the entrance A¹. A torsional spring L⁴ connected at one end to the rock shaft and at the opposite end to one of the bearings L⁵ serves to rock the plate L upward to effect the lifting of the matrices. This movement of the plate, however, is controlled by a rotary cam member M on the shaft I and coöperating with a roller L⁶ carried by an arm projecting from the end of the plate L. The member M is formed with a notch M¹ (see Fig. 5) to allow the spring L⁴ to exert its lifting action upon the plate L, when the roller L⁶ comes into engagement with the notch at each complete rotation of the shaft I.

The action of the parts will now be clear. At or about the time the plate G is moved to one of its positions, as controlled by the rotary cam member I¹, the cam member M brings its notch M¹ opposite the roller L⁶ on the plate L so as to allow the latter to be rocked upward by the spring L⁴ to shift the matrices edgewise in the manner just described. Immediately thereafter, the continued rotation of the member M carries its notch out of engagement with the roller L⁶ and thereby rocks the plate L in the opposite direction to withdraw the teeth L¹ from the channels and permit the matrices to be shifted back to their original position, from which they pass downwardly and are arrested by the lips J¹ of the pawls J. It will be noted that the actuation of the pawls J is effected through the medium of the matrices themselves, the purpose of this arrangement being to prevent the release of a matrix held by the lip J¹ unless there be present a second matrix to take its place immediately. This feature is of advantage in that it insures the regular and certain delivery of a matrix to the plate G whenever the pawls are actuated, although it follows that the distribution of the matrices will not be automatically completed, as the last matrices will be held by the pawls, due to the absence of following matrices by which the actuation of the pawls would be effected. However, if for any reason it becomes desirable to complete the distribution of the matrices, such for instance as when the magazine is to be removed, the pawls may be lifted by hand or otherwise to release the matrices.

In order to guide the matrices in a definite path as they are brought under the action of the escapement pawls J and the teeth of the rocker plate L, I provide the partitions a at this point with flanges N (Figs. 3 and 6) projecting laterally from their opposite edges so as to engage the ears at the upper and lower edges of the matrices. The matrices will thus be under positive control, without regard to their different body thicknesses, and the engagement of their ears with the lips J¹ of the pawls and the teeth L¹ of the rocker plate will be insured.

The entrance A¹ is carried by a pair of arms O arranged at its opposite sides and mounted to turn about the rod G¹ fixed to the bracket arms G² (see particularly Figs. 1 and 5). In this way, the entrance may be swung downward from its operative position when required to give access to the magazine A or the other interior parts. It will be noted that the operating means for the rocker plate L and the reciprocating plate G are so arranged as to permit this movement without interference. A spring O¹ connected at one end to the machine frame, as at O² (see Fig. 1), and at the opposite end to one of the arms O serves to hold the entrance in its operative position, as well as a counterbalance when it is moved therefrom.

As before stated, I have shown my invention merely in preferred form and by way of example, and it will be obvious that many of the details may be widely varied in form or in arrangement without materially changing their mode of action or the results secured by the general organization. It will also be obvious that some of the details shown may be used in other connections to subserve analogous functions. Such modifications or alterations will readily suggest themselves to those skilled in the art, and I therefore desire it to be understood that I do not limit myself to any specific form or embodiment of the parts, except in so far as such limitations are specified in the appended claims.

Having thus described my invention, its construction and mode of operation, what I claim and desire to secure by Letters Patent of the United States, is as follows:

1. Typographical distributing mechanism comprising a conductor along which the type or matrices travel endwise and formed with an opening between its ends, and fixed or permanent means for discharging the type or matrices edgewise from the conductor through said opening.

2. In a typographical machine, the combination of type or matrices each formed with an inclined cut or notch in its side face extending only partly therethrough, and a distributing conductor along which the type or matrices travel, the said conductor being provided with a laterally projecting stud to engage in the notches of the type or matrices and discharge them edgewise therefrom.

3. In a typographical machine, the combination of two sets of type or matrices, and a distributing conductor along which they travel endwise and provided with a laterally projecting stud, the type or matrices of one set being formed in their side faces with inclined cuts or notches adapted to engage the said stud so as to discharge them edgewise from the conductor, and the type or matrices of the other set being formed with grooves extending longitudinally throughout their extent and adapted to register with said stud so as to permit them to pass thereby.

4. In a typographical machine, the combination of type or matrices each formed in its side face with an inclined cut or notch and also with a groove extending longitudinally therethrough, and two distributing conductors, one communicating with the other, and each provided with a projecting stud, the stud of the first conductor adapted to engage the inclined cuts in the type or matrices and deflect them edgewise therefrom into the second conductor, and the stud of the latter adapted to register with the longitudinal grooves in the type or matrices so as to permit them to pass thereby.

5. In a typographical machine, the combination of type or matrices each formed with an inclined cut or notch, and two distributing conductors, one communicating with the other, and each provided with a stud to engage in the notches of the type or matrices and deflect them edgewise therefrom.

6. In a typographical machine, the combination of two sets of type or matrices each formed with a groove extending longitudinally throughout its extent, and two distributing conductors, one communicating with the other, and provided with differently located projecting studs, the grooves of the type or matrices of one set being located so as to register with the stud of the first conductor, and the grooves of the type or matrices of the other set being differently located so as to register with the stud of the second conductor, for the purpose described.

7. Typographical distributing mechanism comprising an inclined conductor formed with an opening in its bottom edge to permit the passing type or matrices to fall therethrough by gravity, and means to close and expose said opening alternately, for the purpose described.

8. Typographical distributing mechanism comprising an inclined conductor formed with an opening in its bottom edge to permit the passing type or matrices to fall therethrough by gravity, a cover flap for said opening, and means for moving said flap to active and inactive position alternately.

9. In a typographical machine, the combination of type or matrices of variant form, a distributing conductor along which they travel in an edgewise position and formed with an opening in one of its edges, means for carrying the type or matrices of one form past said opening, and means for deflecting those of another form edgewise therethrough.

10. Typographical distributing mechanism comprising a conductor along which the type or matrices travel and formed with an opening, means for arresting the type or matrices opposite the opening, and means for closing and exposing the opening alternately, for the purpose described.

11. Typographical distributing mechanism comprising a conductor along which the type or matrices travel and formed with an opening, means for closing and exposing the opening alternately, and means for arresting the type or matrices opposite the opening when it is closed and for deflecting them therethrough when it is subsequently exposed.

12. Typographical distributing mechanism comprising a conductor along which the type or matrices travel and formed with an opening, a cover flap for said opening movable alternately to active and inactive position, and means for arresting the type or matrices opposite said opening when the flap is in its active position.

13. Typographical distributing mechanism comprising a conductor along which the type or matrices travel and formed with an opening, a cover flap for said opening movable alternately to active and inactive position, and means for arresting the type or matrices opposite said opening when the flap is in active position and for deflecting them therethrough when the flap is subsequently moved to inactive position.

14. Typographical distributing mechanism comprising a conductor along which the type or matrices travel and formed with an opening, means for exposing and closing said opening alternately, and means for arresting the type or matrices in advance of the opening when the latter is exposed.

15. Typographical distributing mechanism comprising a conductor along which the type or matrices travel and formed with an opening, means for exposing and closing said opening alternately, and means for arresting the type or matrices in advance of the opening when exposed, and for subsequently releasing them when it is closed.

16. Typographical distributing mechanism comprising a conductor along which the type or matrices travel and formed with an opening, means for exposing and closing said opening alternately, and means for arresting the type or matrices in advance of and opposite the opening as the latter is exposed and closed respectively.

17. Typographical distributing mechanism comprising a conductor along which the type or matrices travel and formed with an opening, a cover flap for said opening movable alternately to active and inactive position, and means for arresting the type or matrices in advance of or opposite the opening according to the position of the flap.

18. In a typographical machine, the combination of two sets of type or matrices, a distributing conductor along which they travel and formed with an opening, means for closing and exposing said opening alternately, and means for arresting the type or matrices of one set opposite said opening when the latter is closed, the type or matrices of the other set being formed so as to pass said arresting means and across the opening.

19. In a typographical machine, the combination of two sets of type or matrices, and a distributing conductor along which they travel and formed with a projecting stud adapted to arrest the type or matrices of one set at a given point, the type or matrices of the other set being formed with longitudinal grooves adapted to register with said stud to permit them to pass thereby.

20. In a typographical machine, the combination of two sets of type or matrices, a distributing conductor along which they travel and formed with an opening, a cover flap for said opening movable alternately to active and inactive position, and a projecting stud adapted to arrest the type or matrices of one set opposite the opening when the flap is in its active position, the type or matrices of the other set being each formed with a groove extending longitudinally therethrough and adapted to register with said stud so as to allow them to pass thereby and across the opening in the conductor, all for the purpose described.

21. Typographical distributing mechanism comprising a conductor along which the type or matrices travel and formed with an opening, a cover flap for said opening movable alternately to active and inactive position, and means for arresting the type or matrices in advance of the opening when the flap is in inactive position and for subsequently releasing them when the flap is moved to active position.

22. A distributing conductor along which the type or matrices travel endwise and having a laterally projecting stud adapted to engage the type or matrices, the said conductor being provided with a guiding plate projecting partly across the conductor to engage the ears of the type or matrices so as to insure the engagement of the latter with the stud irrespective of their relative thicknesses.

23. Typographical distributing mechanism comprising a conductor along which the type or matrices travel and formed with an opening and having a projecting stud to engage them opposite the opening, a cover flap for the opening movable alternately to active and inactive position, and guiding plates formed on the conductor and cover flap respectively and projecting partly across the conductor and adapted to engage the ears of the type or matrices to insure the engagement of the latter with the stud irrespective of their relative thicknesses.

24. Typographical distributing mechanism comprising a series of conductors for the type of matrices formed with openings and divided into groups, and means for covering the openings of one group and exposing those of the other group, alternately.

25. Typographical distributing mechanism comprising a series of conductors for the type or matrices formed with openings and divided into groups, the conductors of one group being alternated with those of the other group, a reciprocating plate having a series of cover flaps, and means for moving the plate back and forth to project the flaps across the openings of the several groups, alternately, for the purpose described.

26. Typographical distributing mechanism comprising a series of conductors for the type or matrices formed with openings and divided into groups, means for covering the openings of one group and exposing those of the other group alternately, and means for arresting the type or matrices in each group in advance of the openings therein when they are exposed and for releasing the type or matrices when the openings are subsequently closed.

27. Typographical distributing mechanism comprising a series of conductors for the type or matrices formed with openings and divided into groups, the conductors of one group being alternated with those of the other group, a reciprocating plate provided with a series of cover flaps to close the openings of one group, and further with a series of shoulders to arrest the type or matrices in advance of the openings in the other group, and means for reversing the position of the plate periodically, for the purpose described.

28. Typographical distributing mechanism comprising a series of conductors for the type or matrices formed with openings and divided into groups, means for arresting the type or matrices opposite the openings in the several groups, and means for closing the openings of one group and exposing those of the other group, alternately.

29. Typographical distributing mechanism comprising a series of conductors for the type or matrices formed with openings and divided into groups, means for closing the openings of one group and exposing those of the other group alternately, and means for arresting the type or matrices in each group opposite and in advance of the openings thereof as they are closed and exposed, respectively.

30. Typographical distributing mechanism comprising a series of conductors for the type or matrices formed with openings and divided into groups, the conductors of one group being alternated with those of the other group and each formed with a projecting stud to arrest the type or matrices opposite the corresponding opening therein, and a reciprocating plate provided with a series of cover flaps and movable back and forth to project them across the openings of the two groups alternately, for the purpose described.

31. Typographical distributing mechanism comprising a series of conductors for the type or matrices formed with openings and divided into groups, the conductors of one group being alternated with those of the other group and those of both groups being formed each with a projecting stud to arrest the type or matrices opposite the corresponding opening therein, a reciprocating plate provided with a series of cover flaps to close the openings of one group and further with a series of shoulders to arrest the type or matrices in advance of the openings in the other group, and means for reversing the position of the plate periodically, for the purpose described.

32. In a typographical machine, the combination of a plurality of magazines containing type or matrices of different fonts, distributing mechanism for separating the type or matrices according to character irrespective of font, a series of conductors along which they travel and leading to one magazine, a second series of conductors communicating with the first and leading to another magazine, means for alternately opening and closing the passages between the two series, and means for arresting the type or matrices of one font opposite said passages when they are closed, while allowing the type or matrices of another font to pass thereby, for the purpose described.

33. In a typographical machine, the combination of a plurality of magazines containing type or matrices of different fonts, distributing mechanism for separating the type or matrices according to character irrespective of font, a series of conductors along which they travel and leading to one magazine, a second series of conductors communicating with the first and leading to another magazine, and means for alternately opening and closing the passages between the two series, the conductors of the first series being provided with projecting studs to arrest the type or matrices of one font opposite the passages when they are closed, and the type or matrices of another font being formed with longitudinal grooves to register with said studs so as to pass thereby into the corresponding magazine.

34. In a typographical machine, the combination of a plurality of magazines containing type or matrices of different fonts, distributing mechanism for separating the type or matrices according to character irrespective of font, a series of conductors leading from the distributing mechanism to one magazine, a second series of conductors communicating with the first series and leading to another magazine, a third series of conductors communicating with the second series and leading to a third magazine, and means for alternately opening and closing the passages between the several series of conductors, the conductors of the first series being provided with projecting studs to arrest the type or matrices of several fonts opposite the passages to the second series, and the conductors of the latter series being provided with projecting studs located in a different position thereon to arrest type or matrices opposite the passage leading to the third series, the type or matrices of one font being formed with longitudinal grooves to register with the studs of the first series so as to pass thereby into the first magazine, and the type or matrices of another font being formed with similar but differently located longitudinal grooves to register with the studs of the second series to allow them to pass thereby into the second magazine.

35. In a typographical machine, the combination of a plurality of magazines containing different fonts of type or matrices, distributing mechanism for separating the type or matrices according to character irrespective of font, a series of conductors along which they travel in an edgewise position, a second series of conductors communicating with the first and leading to one of the magazines, and fixed or permanent means for deflecting the type or matrices of one font edgewise from the first directly into the second series of conductors.

36. In a typographical machine, the combination of a plurality of magazines containing different fonts of type or matrices, distributing mechanism for separating the type or matrices according to character irrespective of font, a series of conductors along which they travel in an edgewise position, a second series of conductors communicating with the first and leading to one of the magazines, and projecting studs located opposite the passages between the two series of conductors, the type or matrices of one font being formed with inclined cuts or notches to engage said studs and be deflected thereby edgewise directly into the second series of conductors.

37. In a typographical machine, the combination of a plurality of magazines containing different fonts of type or matrices, distributing mechanism for separating the type or matrices according to character irrespective of font, a series of conductors along which they travel in an edgewise position and leading to one magazine, a second series of conductors communicating with the first and leading to another of the magazines, and projecting studs located opposite the passages between the two series of conductors, the type or matrices of one font being formed with inclined cuts or notches to engage said studs and be deflected thereby edgewise directly into the second series of conductors, and the type or matrices of another font being formed with longitudinal grooves to register with said studs so as to pass thereby into the corresponding magazine.

38. In a typographical machine, the combination of three magazines containing different fonts of type or matrices, distributing mechanism to separate the type or matrices according to character irrespective of font, a series of conductors leading from the distributing mechanism to the first magazine, a second series of conductors communicating from the first and leading to the second magazine, and a third series of conductors communicating with the second series and leading to the third magazine, each of the first and second series of conductors being provided with projecting studs located opposite the passages between it and the communicating series, and the type or matrices of one font being formed with inclined cuts or notches adapted to engage successively the projecting studs of the two series so as to be delivered to the third magazine.

39. In a typographical machine, the combination of three magazines containing different fonts of type or matrices, distributing mechanism to separate the type or matrices according to character irrespective of font, a series of conductors leading from the distributing mechanism to the first magazine, a second series of conductors communicating with the first and leading to the second magazine, and a third series of conductors communicating with the second series and leading to the third magazine, the conductors of the first series being formed with projecting studs adapted to deflect type or matrices into the second series, and the conductors of the latter series being formed with differently located studs to deflect type or matrices into the third series, the type or matrices of one font being formed with longitudinal grooves to register with the studs of the first series so as to pass into the first magazine, and the type or matrices of another font being formed with differently located longitudinal grooves to register with the projecting studs of the second series so as to pass into the second magazine, all in the manner described.

40. Typographical distributing mechanism comprising a series of conductors for the type or matrices formed with openings and divided into groups, the conductors of one group being alternated with those of the other group, a reciprocating plate having a series of cover flaps, and means for moving the plate back and forth to project its flaps across the openings in the several groups alternately, the said means being timed so as to cause the plate to dwell slightly in either of its positions.

41. Typographical distributing mechanism comprising a series of conductors for the type or matrices formed with openings and divided into groups, the conductors of one group being alternated with those of the other group, a reciprocating plate provided with a series of cover flaps to close the openings of one group and further with a series of shoulders to arrest the type or matrices in advance of the openings in the other group, and means for reversing the position of the plate periodically, the said means being timed so as to cause the plate to dwell slightly in either of its positions.

42. In a typographical machine, the combination of a channel along which the type or matrices travel, an escapement to arrest the leading type or matrix, and means for effecting the releasing action of the escapement through the medium of the next succeeding type or matrix.

43. In a typographical machine, the combination of a conductor along which the type or matrices travel, and an escapement to arrest the leading type or matrix, the releasing action of said escapement being controlled by the next succeeding type or matrix.

44. In a typographical machine, the combination of a conductor along which the type or matrices travel, an escapement to arrest the leading type or matrix and adapted to be engaged by a succeeding one, and means for shifting the second matrix edgewise to effect the releasing action of the escapement.

45. In a typographical machine, the combination of a conductor along which the type or matrices travel, with an escapement to control their passage, the said escapement comprising a pivoted member J formed with a lip $J^1$ to arrest the leading type or matrix and further with a lug $J^2$ adapted to be engaged by the next succeeding type or matrix, together with means for shifting the second matrix edgewise to withdraw the lip J' from its arresting position to release the first matrix.

46. Typographical distributing mechanism comprising a series of conductors for the type or matrices formed with openings and divided into groups, the conductors of one group being alternated with those of the other group, a reciprocating plate having a series of cover flaps and movable back and forth to close the openings in the respective groups alternately, and escapement mechanism to control the delivery of the type or matrices to the plate, the said escapements being actuated synchronously with the movement of the plate.

47. Typographical distributing mechanism comprising a series of conductors for the type or matrices formed with openings and divided into groups, the conductors of one group being alternated with those of the other group, a reciprocating plate provided with a series of cover flaps to close the openings of one group and further with a series of shoulders to arrest the type or matrices in advance of the openings in the other group, means for reversing the position of the plate periodically, an escapement mechanism to control the delivery of the type or matrices to the action of the plate, and means for actuating the escapements in synchronism with the movement of the plate.

48. In a typographical machine, the combination of a series of conductors along which the type or matrices travel, escapement pawls therefor adapted to arrest the leading type or matrices therein, and a rocker plate formed with teeth adapted to engage the succeeding type or matrices in the various conductors and shift them edgewise to effect the releasing action of the escapement pawls.

49. In a typographical machine, the combination of a conductor along which the type or matrices travel, an escapement to engage the ears of the type or matrices and control their passage therethrough, the said conductor being formed with a guide-plate projecting partly across it to engage the ears of the type or matrices and thus insure their engagement with the escapement.

50. A type or matrix formed with an inclined cut or notch passing only partly therethrough and extending entirely across its side face from its bottom edge to one of its vertical edges, in combination with distributing mechanism to coöperate with said type or matrix.

51. A type or matrix formed with an inclined cut or notch extending entirely across its side face from one edge to another, and also with a longitudinal groove extending throughout its body portion, in combination with distributing mechanism to coöperate with said type or matrix.

In testimony whereof, I have affixed my signature in presence of two witnesses.

GEORGE P. KINGSBURY.

Witnesses:
E. H. ALLEN,
CHARLES R. PARSONS.